(12) United States Patent
Chaves

(10) Patent No.: US 9,968,961 B2
(45) Date of Patent: May 15, 2018

(54) CORAL DIPPING TANK

(71) Applicant: Hernan Chaves, Anaheim, CA (US)

(72) Inventor: Hernan Chaves, Anaheim, CA (US)

( * ) Notice: Subject to any disclaimer, the term of this patent is extended or adjusted under 35 U.S.C. 154(b) by 293 days.

(21) Appl. No.: 14/807,768

(22) Filed: Jul. 23, 2015

(65) Prior Publication Data
US 2017/0021386 A1 Jan. 26, 2017

(51) Int. Cl.
B05D 1/18 (2006.01)
B05B 9/04 (2006.01)
B05C 3/02 (2006.01)
B05D 1/02 (2006.01)
A01K 63/00 (2017.01)
B05B 1/20 (2006.01)
B08B 3/00 (2006.01)
B08B 3/02 (2006.01)
B05B 15/06 (2006.01)

(52) U.S. Cl.
CPC .............. B05D 1/18 (2013.01); A01K 63/00 (2013.01); B05B 1/20 (2013.01); B05B 9/0403 (2013.01); B05B 15/066 (2013.01); B05C 3/02 (2013.01); B05D 1/02 (2013.01); B08B 3/006 (2013.01); B08B 3/02 (2013.01)

(58) Field of Classification Search
None
See application file for complete search history.

(56) References Cited

U.S. PATENT DOCUMENTS

| | | | | |
|---|---|---|---|---|
| 4,842,001 A * | 6/1989 | O'Leary | ............... | B08B 3/02 134/112 |
| 5,482,064 A * | 1/1996 | Goddard | ............... | B08B 3/006 134/112 |
| 2005/0022332 A1* | 2/2005 | McMillen | ............... | B08B 3/026 15/320 |
| 2005/0115593 A1* | 6/2005 | Publ | ............... | B08B 3/006 134/61 |
| 2009/0301528 A1* | 12/2009 | Goddard | ............... | B08B 3/006 134/32 |
| 2010/0307544 A1* | 12/2010 | Lele | ............... | B08B 3/006 134/105 |
| 2012/0318155 A1* | 12/2012 | Fappiano | ............... | B24C 1/003 101/425 |
| 2013/0255152 A1* | 10/2013 | Johnson | ............... | A01G 31/02 47/62 C |

OTHER PUBLICATIONS

Cedarberg, "Snap-Loc Systems", 2013.*

* cited by examiner

Primary Examiner — Shamim Ahmed
Assistant Examiner — Bradford M Gates
(74) Attorney, Agent, or Firm — The Law Office of Austin Bonderer, PC; Austin Bonderer

(57) ABSTRACT

A dipping tank includes a pump, a container, a fitting, and a plate which is used to place objects, such as corals, to be dipped. The pump draws fluid from inside the container and discharges it into the container through the fitting. The fitting includes two flexible hoses, one with a propulsive nozzle and the other with one or more dipping nozzles. The propulsive nozzle produces a jet which impinges upon the blades protruding from the bottom side of the plate causing the plate to rotate. The dipping nozzles eject jets which are used to spray and thereby dip the objects. Flexible hoses are configured so as to provide movements in 6 degrees of freedom for the nozzles. Flexible hoses may also further comprise valves to control fluid flow through said hoses.

18 Claims, 3 Drawing Sheets

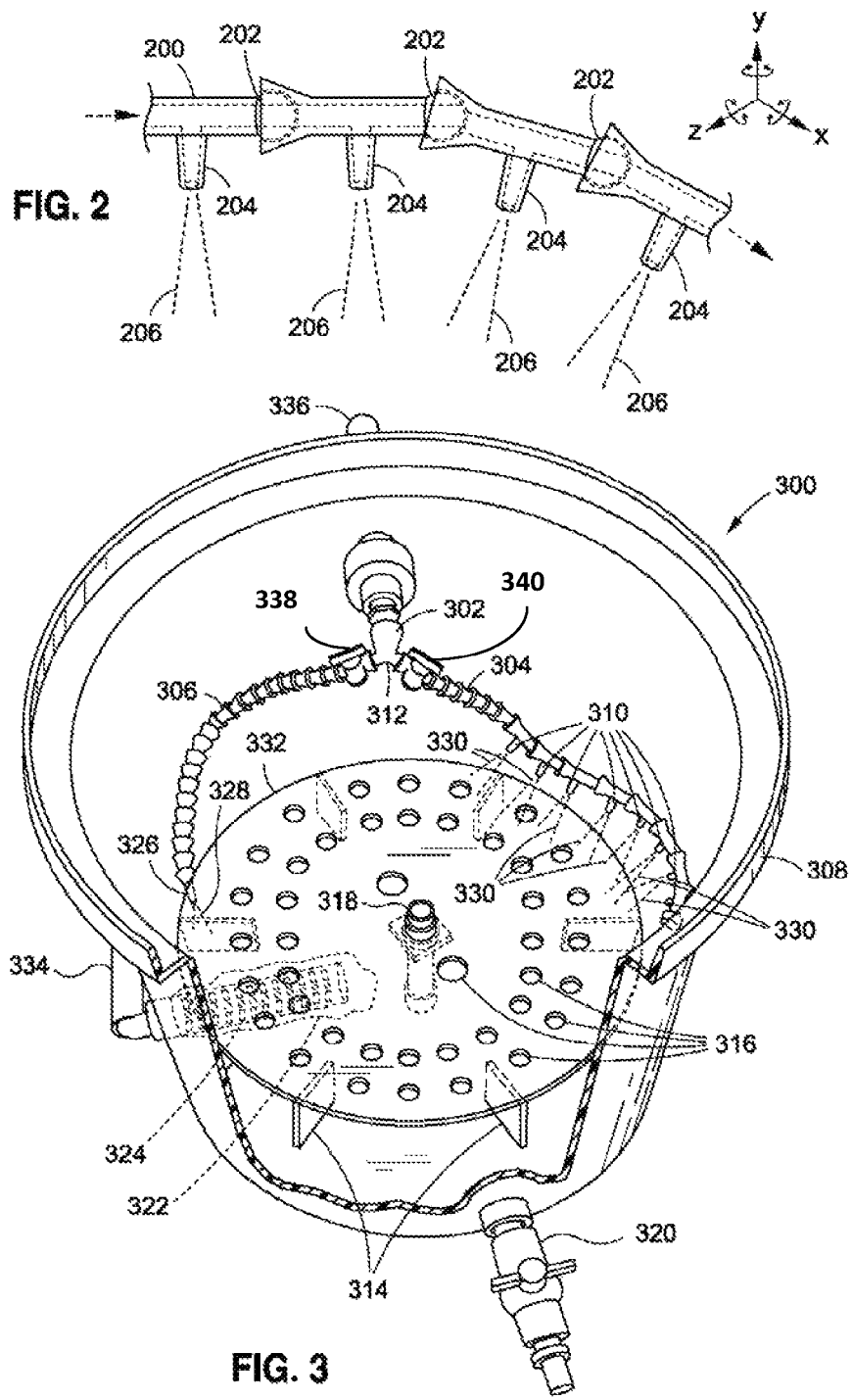

CORAL DIPPING TANK

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to a dipping tank which includes a pump, coupled with an input pipe and an output pipe, a container, a fitting, and a plate operative to receive objects, such as corals, to be dipped via the dipping tank. The pump draws fluid from inside the container and pumps it through two flexible hoses having propulsive and dipping nozzles. The propulsive jet and dipping jets from the nozzles are used to rotate the plate and dip the objects, respectively.

BACKGROUND

Cleaning corals, commonly referred to as dipping by artisans of ordinary skill, is extremely important before introducing them to a new environment containing other marine animals. The dipping is manual and very time consuming. The corals are often placed in a container and sprayed with a solution using tools that produce fluid jets, such as a turkey baster, in order to dip the corals.

The present invention provides a dipping tank that can be used to dip objects, including marine animals such as corals. The dipping tank is equipped with a pump that draws fluid from inside a container and discharges the fluid at high pressure into a fitting with two flexible hoses having nozzles that eject fluid jets. A plate having blades protruding from the bottom of the plate is placed inside the container and can rotate around the container's central shaft. One fluid jet from one of the flexible hoses is utilized to impinge upon the blades thereby causing the plate to rotate. The other flexible hose has one or more nozzles which produce water jets to spray the objects that are placed on the top of the plate while they rotate with the plate. The flexible hoses are configured to freely move in six (6) degrees of freedom providing for a thorough dipping of the objects. Although the dipping tank of the present invention is ideal to dip corals, it should be clear to artisans of ordinary skill that the tank can be used for simple cleaning of objects and as such is not limited to dipping corals only.

SUMMARY

In one aspect, a dipping tank is disclosed wherein the tank comprises a pump, coupled with an input pipe and an output pipe, operative to receive fluid from one end of the input pipe and discharge the fluid into one end of the output pipe, a container operative to receive the fluid from the other end of the output pipe and discharge the fluid into the other end of the input pipe, said container having a central shaft, a fitting having an inlet and first and second flexible outlet hoses, wherein the inlet is coupled with the other end of the output pipe, wherein the first flexible outlet hose comprises a propulsive nozzle operative to eject a propulsive jet, wherein the second flexible outlet hose comprises one or more dipping nozzles operative to eject one or more dipping jets, and a plate having a central hole, one or more radial holes, and one or more blades protruding from a bottom side of the plate, wherein the central hole is operative to receive the central shaft, wherein the one or more radial holes are operative to receive one or more objects, wherein the propulsive jet is operative to impinge on the one or more blades thereby causing the plate to rotate around the central shaft and wherein the one or more dipping jets are operative to spray the one or more objects thereby dipping said one or more objects.

Preferably, the pump is an electric pump. Preferably, the fluid is water. Preferably, at least one of the input pipe and the output pipe is made from Polyvinyl chloride (PVC). Preferably, the container is substantially cylindrical. Preferably, the container is made from plastic material. Preferably, the fitting is made from plastic material. Preferably, the one or more objects is at least one of an inanimate object and an animate object. Preferably, the animate object is a coral.

Preferably, the first and second flexible outlet hoses further comprise a plurality of joints configured to provide movements in 6 degrees of freedom for the propulsive nozzle and the one or more dipping nozzles.

Preferably, the first flexible outlet hose further comprises a valve operative to control the fluid flow through the first flexible outlet hose.

Preferably, the second flexible outlet hose further comprises a valve operative to control the fluid flow through the second flexible outlet hose.

Preferably, the other end of the input pipe further comprises a filter.

Preferably, the container further comprises a drainage faucet.

In another aspect, a method of dipping one or more objects in a tank is disclosed wherein the method comprises providing a pump, coupled with an input pipe and an output pipe, operative to receive fluid from one end of the input pipe and discharge the fluid into one end of the output pipe, providing a container operative to receive the fluid from the other end of the output pipe and discharge the fluid into the other end of the input pipe, said container having a central shaft, providing a fitting having an inlet and first and second flexible outlet hoses, wherein the inlet is coupled with the other end of the output pipe, wherein the first flexible outlet hose comprises a propulsive nozzle operative to eject a propulsive jet, wherein the second flexible outlet hose comprises one or more dipping nozzles operative to eject one or more dipping jets, and providing a plate having a central hole, one or more radial holes, and one or more blades protruding from a bottom side of the plate, wherein the central hole is operative to receive the central shaft, wherein the one or more radial holes are operative to receive the one or more objects, wherein the propulsive jet is operative to impinge on the one or more blades thereby causing the plate to rotate around the central shaft and wherein the one or more dipping jets are operative to spray the one or more objects thereby dipping said one or more objects.

In another aspect, a dipping tank is disclosed, wherein the tank comprises a pump, coupled with an input pipe and an output pipe, operative to receive fluid from one end of the input pipe and discharge the fluid into one end of the output pipe, a container operative to receive the fluid from the other end of the output pipe and discharge the fluid into the other end of the input pipe, said container having a central shaft operative to rotate around its axis via a motor, a flexible outlet hose coupled with the other end of the output pipe, wherein the flexible outlet hose comprises one or more dipping nozzles operative to eject one or more dipping jets, and a plate having a central hole and one or more radial holes, wherein the central hole is coupled with the central shaft such that the plate rotates with the central shaft and wherein the one or more radial holes are operative to receive one or more objects, wherein the one or more dipping jets are operative to spray the one or more objects thereby dipping said one or more objects.

DESCRIPTION OF THE DRAWINGS

FIG. 2 shows a partial perspective view of a preferred embodiment of a flexible outlet hose including three joints.

FIG. 3 shows a cutaway perspective view of a preferred embodiment of a dipping tank and its components according to the present invention.

DETAILED DESCRIPTION OF THE PRESENTLY PREFERRED EMBODIMENTS

Figure 1:
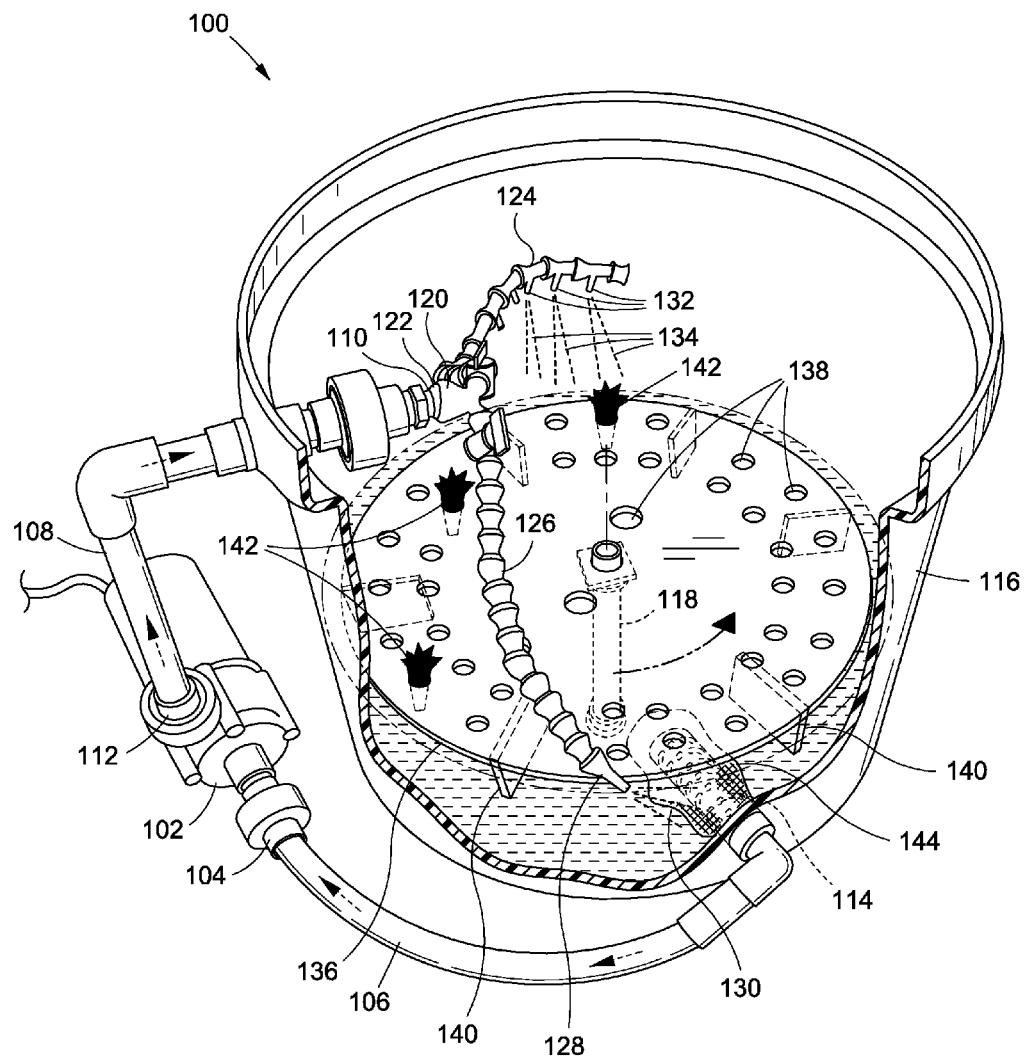
FIG. 1 shows a cutaway perspective view of a preferred embodiment of a dipping tank and its components according to the present invention.

FIG. 1 depicts a diagram 100 of a cutaway perspective view of a preferred embodiment of a dipping tank comprising a pump 102, a container 116, a fitting 120, and a plate 136. The pump 102 pumps fluid from inside the container 116 and circulates it through the fitting 120 whose flexible hoses with nozzles, discussed below, rotate the plate 136 and spray objects that are placed on the plate 136.

In this preferred embodiment, the pump 102 is coupled with an input pipe 106 having an end 114 and another end 104. The pump 102 receives the fluid (not shown for clarity but known to artisans of ordinary skill) from the end 104 of the input pipe 106. The pump 102 is also coupled with an output pipe 108 having an end 112 and another end 110. The pump discharges the fluid into the end 112 of the output pipe 108. The pump 102 may be any type of pump which can operate manually, or via other types of energy source including electricity, engines, wind power, etc. In this preferred embodiment, the pump 102 is an electric pump driven by electrical energy. The input pipe 106 and the output pipe 108 are made from Polyvinyl chloride (PVC).

The container 116 receives the fluid from the end 110 of the output pipe 108. In this preferred embodiment, the container 116 is coupled with the input pipe 106 and the output pipe 108 through two holes which are cut through the container 116. In another preferred embodiment, the container 116 receives the input pipe 106 and the output pipe 108 without being coupled with them. Specifically, the input pipe 106 and output pipe 108 are bent over the rim of the container 116. The container 116 further comprises a central shaft 118 operative to be received by the plate 136 which is discussed in more detail below.

The fitting 120 comprises an inlet 122, a first flexible outlet hose 126, and a second flexible outlet hose 124. In this preferred embodiment, the first flexible outlet hose 126 and the second flexible outlet hose 124 are flexible hose assemblies comprising joints with ball and socket such as the Loc-Line® flexible hose assembly available from Lockwood Products, Inc. in Lake Oswego, Oreg., U.S.A. The first flexible outlet hose 126 and the second flexible outlet hose 124 move with 6 degrees of freedom, i.e., they can move in the x, y, and z directions and rotate about the x, y, and z directions as shown in FIG. 2. These types of assemblies are described in the U.S. Pat. No. 6,042,165 to Lockwood whose disclosure is hereby incorporated by reference in its entirety.

The inlet 122 is coupled with the end 110 of the output pipe 108. The fluid is discharged into the inlet and flows through the first flexible outlet hose 126 and the second flexible outlet hose 124. The first flexible outlet hose 126 has a nozzle at its end which is referred to as propulsive nozzle 128. The term propulsive is not limiting but it only indicates that the first flexible outlet hose 126 with its propulsive nozzle 128 is used to rotate the plate 136, discussed in more detail below. Accordingly, the second flexible outlet hose 124 could be used for the same purpose. The fluid flows through the first flexible outlet hose 126 and is ejected through the propulsive nozzle 128 as a propulsive jet 130 such that the propulsive jet 130 impinges on protruding blades 140 of the plate 136, discussed below, and rotates the plate 136 around the central shaft 118 of the container 116.

The second flexible outlet hose 124 has one or more nozzles, in this preferred embodiment three (3) nozzles, along its length which are referred to as dipping nozzles 132. The second flexible outlet hose 124 is closed at its end so that the fluid is ejected through the nozzles 132 as dipping jets 134. These dipping jets 134 spray objects 142, such as corals, that are placed on the plate 136 through radial holes 138.

The plate 136 has a central hole 408 (see FIG. 4) and several radial holes 138 which are used to place the objects 142 on the plate 136 to be dipped by the dipping jets 134. The plate 136 has six (6) blades 140 protruding from the bottom side of the plate 136. The propulsive jet 130 impinges on the blades 140 and the propulsive force of the propulsive jet 130 pushes the blades 140 and causes the plate 136 to rotate around the central shaft 118 of the container 116. As the plate 136 rotates around the central shaft 118, the objects 142 pass through the dipping jets 134 and are thereby dipped.

FIG. 2 depicts a partial perspective view of a preferred embodiment of a flexible outlet hose 200, such as the first flexible outlet hose 126 or the second flexible outlet hose 124. In this preferred embodiment, the flexible outlet hose 200 includes joints 202. The flexible outlet hose 200 further includes nozzles 204 which eject jets 206 which are used to dip objects such as the objects 142 discussed above.

The joints 202 and the flexible material used in the flexible outlet hose 200 provide for six (6) degrees of freedom for the movements of the nozzles 204. As such, the nozzles 204 can be oriented in a number of configurations, allowing for objects of different sizes to be placed on a plate, such the plate 136. In this preferred embodiment, the joints 202 are of the type disclosed in the U.S. Pat. No. 6,042,165. However, other types of joints may be utilized allowing movements of the nozzles 204 in all six (6) degrees of freedom.

FIG. 3 depicts a diagram 300 of a cutaway perspective view of a preferred embodiment of a dipping tank according to the present invention. In this view the pump is hidden but a container 308, a fitting 312, and a plate 332 can be clearly seen. In this preferred embodiment, the fitting 312 is made from elastic material such as plastic. The fitting 312 has an inlet 302, a first flexible outlet hose 306, and a second flexible outlet hose 304. The first flexible outlet hose 306 has a propulsive nozzle 326 which ejects a propulsive jet 328. The second flexible outlet hose 304 has seven (7) dipping nozzles 310 which eject fluid, such as water, through seven (7) respective dipping jets 330. The first flexible outlet hose 306 further comprises a valve 338 which operates to control the fluid flow through the first flexible outlet hose 306. By turning the valve 338 the fluid flow through the first flexible outlet hose 306 can be adjusted. This is useful because the speed of the propulsive jet 328 can be thus controlled which in turn controls the rotational speed of the plate 332. As can be seen in the embodiments shown in FIG. 1, FIG. 3, and FIG. 4, the blades 404 provide a constant surface area for the propulsive jet 328 to fully control the rotational speed of the plate 332. The blades' 404 orientation and position is permanently fixed relative to the plate 332. The second flexible outlet hose 304 further comprises a valve 340 which operates to control the fluid flow through the second flexible outlet hose 304. By turning the valve 340 the fluid flow through the second flexible outlet hose 304 can be adjusted. This is useful because the speed of the dipping jets 310 can be thus controlled which in turn controls the dipping of the objects. The container 308 is substantially cylindrical and has a central shaft 318. The container 308 is made from plastic material. An input pipe 334 has an end 324 which is covered by a filter 322. The filter 322 operates to filter the water inside the container 308 before entering the end 324 of the input pipe 334. The container 308 further includes a drainage faucet 320. The drainage faucet 320 operates to drain the water from inside of the container 308 to outside environment.

Figure 4:
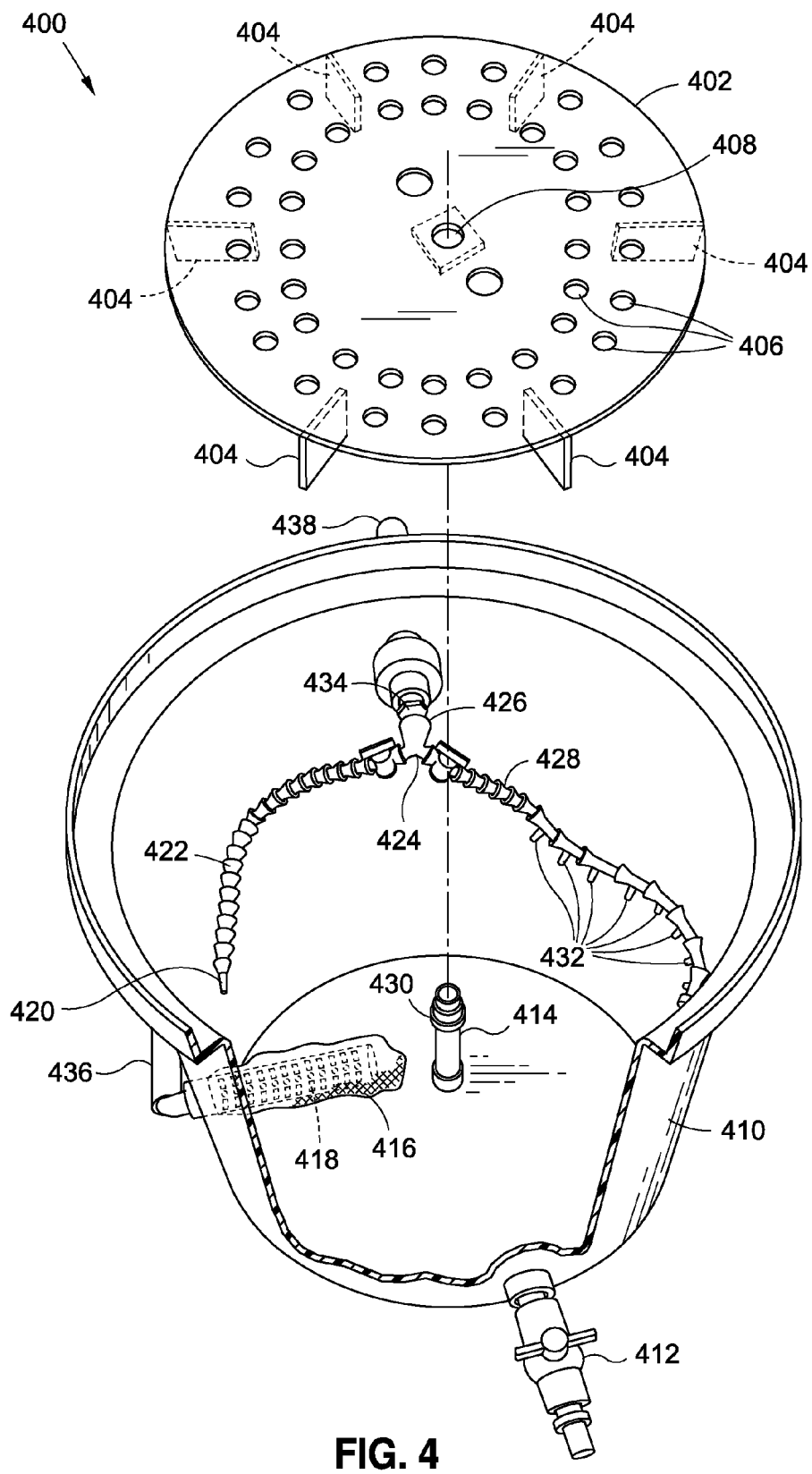
FIG. 4 shows an exploded view of a preferred embodiment of a dipping tank and its components according to the present invention.

FIG. 4 depicts a diagram 400 of an exploded view of a preferred embodiment of a dipping tank with the pump hidden, but a container 410, a fitting 424, and a plate 402 can be clearly seen. The fitting 424 has inlet 426 which is coupled with one end 434 of an output pipe 438. The fitting 424 has a first flexible outlet hose 422 which has a propulsive nozzle 420 and a second flexible outlet hose 428 which has seven (7) dipping nozzles 432. The container 410 has a central shaft 414 and a drainage faucet 412. The plate 402 has a central hole 408 which receives the central shaft 414. In this embodiment, the shaft 414 has a spacer 430 at its end where the spacer 430 supports the plate 402. Other means of supporting the plate 402 on the central shaft 414 is contemplated and are within the scope of the present invention. In this preferred embodiment, the plate 402 is circular but other shapes such as rectangular or oblong are contemplated and are within the scope of the present invention.

The plate 402 has several radial holes, three (3) of which are designated as radial holes 406. These radial holes are used to place objects to be dipping via the dipping tank of the present invention. The plate 402 further comprises six (6) blades 404 which are used to rotate the plate 420. As the propulsive jets, such as those discussed above, hit the blades 404 they propel them causing the plate 402 to rotate.

However, in a preferred embodiment, the dipping tank of the present invention may include a motor (not shown but known to artisans of ordinary skill) coupled with the central shaft 414 to rotate the shaft 414 in which case the plate 402 need not have any blades protruding from underneath it. In addition, the fitting 424 need not have a first flexible outlet hose 422 or propulsive nozzle 420 because the central shaft 414 is rotated by the motor which in turn rotates the plate 402. In this preferred embodiment, the fitting has only one flexible outlet hose with one or more nozzles to eject the fluid through one or more dipping jets to spray the objects.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A dipping tank, comprising:
   a pump, coupled to an input pipe and an output pipe, operative to receive fluid from an input pipe first end and discharge the fluid into an output pipe first end;
   a container operative to receive the fluid from an output pipe second end and discharge the fluid into an input pipe second end, and said container comprises a central shaft;
   a fitting having an inlet and first flexible outlet hose and second flexible outlet hose, wherein the inlet is coupled to the output pipe second end, wherein the first flexible outlet hose comprises a propulsive nozzle operative to eject a propulsive jet, wherein the second flexible outlet hose comprises one or more dipping nozzles operative to eject one or more dipping jets; and
   a plate having a central hole, one or more radial holes, and one or more blades protruding from a bottom side of the plate; wherein the central hole is operative to receive the central shaft, and the one or more radial holes are operative to receive one or more objects;
   wherein the propulsive jet is operative to impinge on the one or more blades thereby causing the plate to rotate around the central shaft and wherein the one or more dipping jets are operative to spray the one or more objects thereby dipping said one or more objects; and the one or more blades' orientation and position is permanently fixed relative to the plate.

2. The tank of claim 1, wherein the pump is an electric pump.

3. The tank of claim 1, wherein the fluid is water.

4. The tank of claim 1, wherein at least one of the input pipe and the output pipe is made from Polyvinyl chloride (PVC).

5. The tank of claim 1, wherein the container is substantially cylindrical.

6. The tank of claim 1, wherein the container is made from plastic material.

7. The tank of claim 1, wherein the fitting is made from plastic material.

8. The tank of claim 1, wherein the one or more objects is a coral.

9. The tank of claim 1, wherein the first flexible outlet hose and the second flexible outlet hose further comprise a plurality of joints configured to provide movements in 6 degrees of freedom for the propulsive nozzle and the one or more dipping nozzles.

10. The tank of claim 1, wherein the first flexible outlet hose further comprises a valve operative to control both fluid flow through the first flexible outlet hose and rotational speed of the plate.

11. The tank of claim 1, wherein the second flexible outlet hose further comprises a valve operative to control fluid flow through the second flexible outlet hose.

12. The tank of claim 1, wherein the input pipe second end further comprises a filter.

13. The tank of claim 1, wherein the container further comprises a drainage faucet.

14. A method of dipping one or more objects in a tank, comprising:
   providing a pump, coupled to an input pipe and an output pipe, that receives fluid from an input pipe first end and discharges the fluid into an output pipe first end;
   providing a container that receives the fluid from an output pipe second end and discharges the fluid into an input pipe second end, said container having a central shaft;

providing a fitting having an inlet and a first flexible outlet hose and a second flexible outlet hose, wherein the inlet is coupled to the output pipe second end, wherein the first flexible outlet hose comprises a propulsive nozzle that ejects a propulsive jet, wherein the second flexible outlet hose comprises one or more dipping nozzles that eject one or more dipping jets; and providing a plate having a central hole, one or more radial holes, and one or more blades protruding from a bottom side of the plate; wherein the central hole receives the central shaft, and the one or more radial holes receive the one or more objects;

wherein the propulsive jet impinges on the one or more blades thereby causing the plate to rotate around the central shaft and wherein the one or more dipping jets spray the one or more objects thereby dipping said one or more objects; and the one or more blades' orientation and position is permanently fixed relative to the plate.

15. The method of claim 14, wherein the first flexible outlet hose further comprises a valve that controls fluid flow through the first flexible outlet hose and rotational speed of the plate.

16. The method of claim 14, wherein the second flexible outlet hose further comprises a valve that controls fluid flow through the second flexible outlet hose.

17. The method of claim 14, wherein the first flexible outlet hose and the second flexible outlet hose further comprises a plurality of joints that can move in 6 degrees of freedom for the propulsive nozzle and the one or more dipping nozzles.

18. The method of claim 14, wherein the input pipe second end further comprises a filter.

* * * * *